United States Patent
Cheng

(10) Patent No.: US 10,771,757 B2
(45) Date of Patent: *Sep. 8, 2020

(54) METHOD AND APPARTUS FOR STEREOSCOPIC FOCUS CONTROL OF STEREO CAMERA

(71) Applicant: MEDIATEK INC., Hsinchu (TW)

(72) Inventor: Chia-Ming Cheng, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 241 days.

This patent is subject to a terminal disclaimer.

(21) Appl. No.: 15/902,436

(22) Filed: Feb. 22, 2018

(65) Prior Publication Data

US 2018/0184064 A1  Jun. 28, 2018

Related U.S. Application Data

(63) Continuation of application No. 13/709,068, filed on Dec. 10, 2012, now Pat. No. 9,948,918.

(51) Int. Cl.
| | |
|---|---|
| *H04N 13/00* | (2018.01) |
| *H04N 13/106* | (2018.01) |
| *H04N 5/232* | (2006.01) |
| *G06K 9/32* | (2006.01) |
| *H04N 13/204* | (2018.01) |
| *H04N 13/239* | (2018.01) |
| *H04N 13/296* | (2018.01) |

(52) U.S. Cl.
CPC ......... *H04N 13/106* (2018.05); *G06K 9/3241* (2013.01); *H04N 5/23212* (2013.01); *H04N 5/23219* (2013.01); *H04N 13/204* (2018.05); *H04N 13/239* (2018.05); *H04N 13/296* (2018.05); *H04N 2013/0081* (2013.01)

(58) Field of Classification Search
USPC .............................................. 348/47, 42, 45
See application file for complete search history.

(56) References Cited

U.S. PATENT DOCUMENTS

| | | | |
|---|---|---|---|
| 8,754,929 B1 * | 6/2014 | Prince ................. | H04N 13/128 348/47 |
| 8,836,765 B2 * | 9/2014 | Paik ...................... | H04N 9/045 348/135 |
| 2006/0176408 A1 | 8/2006 | Choi | |
| 2010/0103281 A1 | 4/2010 | Garg | |
| 2011/0001797 A1 | 1/2011 | Cookson | |

(Continued)

*Primary Examiner* — Nigar Chowdhury
(74) *Attorney, Agent, or Firm* — Oblon, McClelland, Maier & Neustadt, L.L.P.

(57) ABSTRACT

A stereoscopic control method includes: establishing a specific mapping relation between a specific disparity value and a specific set of a first focal setting value of a first sensor of a stereo camera and a second focal setting value of a second sensor of the stereo camera; and controlling stereoscopic focus of the stereo camera according to the specific mapping relation. Besides, a stereoscopic control apparatus includes a mapping unit and a focus control unit. The mapping unit is arranged for establishing at least a specific mapping relation between a specific disparity value and a specific set of a first focal setting value of a first sensor of a stereo camera and a second focal setting value of a second sensor of the stereo camera. The focus control unit is arranged for controlling stereoscopic focus of the stereo camera according to the specific mapping relation.

20 Claims, 4 Drawing Sheets

(56) References Cited

U.S. PATENT DOCUMENTS

| | | |
|---|---|---|
| 2011/0243542 A1 | 10/2011 | Pace |
| 2012/0033051 A1 | 2/2012 | Atanassov |
| 2012/0020202 A1 | 5/2012 | Yoon |
| 2012/0162379 A1* | 6/2012 | Dahi .................... H04N 13/128 348/47 |
| 2012/0162396 A1 | 6/2012 | Huang |
| 2012/0224029 A1 | 9/2012 | Pavani et al. |
| 2012/0242803 A1 | 9/2012 | Tsuda |
| 2012/0249746 A1 | 10/2012 | Cornog et al. |
| 2012/0249750 A1 | 10/2012 | Izzat |
| 2013/0010067 A1 | 1/2013 | Veeraraghavan |
| 2013/0057644 A1 | 3/2013 | Stefanoski |
| 2013/0077880 A1* | 3/2013 | Venkataraman ...... G06T 3/4007 382/232 |
| 2013/0105602 A1* | 5/2013 | Chen ....................... E03C 1/084 239/428.5 |
| 2013/0208083 A1 | 8/2013 | Li |
| 2013/0250062 A1 | 9/2013 | Tin |
| 2013/0329015 A1* | 12/2013 | Pulli .................... H04N 13/239 348/47 |

* cited by examiner

METHOD AND APPARTUS FOR STEREOSCOPIC FOCUS CONTROL OF STEREO CAMERA

CROSS-REFERENCE TO RELATED APPLICATIONS

The application is a continuation application of U.S. application Ser. No. 13/709,068, filed Dec. 10, 2012, which is hereby incorporated by reference in its entirety.

BACKGROUND

The disclosed embodiments of the present disclosure relate to controlling a stereo camera, and more particularly, to a method and an apparatus for stereoscopic focus control of a stereo camera.

With the development of science and technology, users are pursing stereoscopic and more real images rather than high-quality images. There are two techniques of present stereoscopic image display. One is to use a video output apparatus, which collaborates with glasses (such as anaglyph glasses, polarization glasses or shutter glasses), while the other one is to use only a video output apparatus without any accompanying glasses. No matter which technique is utilized, the main theory of stereoscopic image display is to make the left eye and the right eye see different images, and thus the brain will regard different images seen from two eyes as a stereoscopic image.

One way to create the stereoscopic image contents is to use a stereo camera. When the stereo camera is used for capturing a scene, an autofocus function may be enabled to automatically determine the optimal focal settings for two sensors of the stereo camera. The conventional autofocus function may be implemented using a master-slave mechanism or a free-run mechanism. In a case where the master-slave mechanism is employed, one sensor acts as a master sensor, while the other sensor acts as a slave sensor. Therefore, the focal setting determined for the maser sensor would be directly used as the focal setting of the slave sensor. In other words, both of the sensors of the stereo camera would have the same focal setting. As a result, the image captured by the master sensor has clear objects that are in focus; ideally, the image captured by the slave sensor is supposed to have clear objects that are also in focus. However, as both of the sensors of the stereo camera use the same focal setting, the manufacture and/or calibration error between the master sensor and the slave sensor would result in uneven image quality, i.e. one in-focus and the other out-of-focus, which leads to poor stereoscopic visual perception.

In another case where the free-run mechanism is employed, the focal settings of the sensors of the stereo camera are determined independently. In other words, the focal setting of one sensor is allowed to be different from the focal setting of the other sensor. However, the image captured by the one sensor may have clear objects that are in focus at a first depth, while the image captured by the other sensor may have clear objects that are in focus at a second depth different from the first depth. For example, the images respectively captured by the sensors may have different focused objects in respective central focus regions.

SUMMARY

In accordance with exemplary embodiments of the present application, a method and an apparatus for stereoscopic focus control of a stereo camera are proposed to solve the above-mentioned problems.

According to a first aspect of the present application, an exemplary stereoscopic control method is disclosed. The exemplary stereoscopic control method includes the following steps: establishing a specific mapping relation between a specific disparity value and a specific set of a first focal setting value of a first sensor of a stereo camera and a second focal setting value of a second sensor of the stereo camera; and controlling stereoscopic focus of the stereo camera according to the specific mapping relation.

According to a second aspect of the present application, an exemplary stereoscopic control apparatus is disclosed. The exemplary stereoscopic control apparatus includes a mapping unit and a focus control unit. The mapping unit is arranged for establishing a specific mapping relation between a specific disparity value and a specific set of a first focal setting value of a first sensor of a stereo camera and a second focal setting value of a second sensor of the stereo camera. The focus control unit is coupled to the mapping unit, and arranged for controlling stereoscopic focus of the stereo camera according to the specific mapping relation.

These and other objectives of the present application will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." Also, the term "couple" is intended to mean either an indirect or direct electrical connection. Accordingly, if one device is electrically connected to another device, that connection may be through a direct electrical connection, or through an indirect electrical connection via other devices and connections.

The present application proposes a content-aware focus mechanism which makes two sensors of the stereo camera focus on the same object of interest, where focal settings of the sensors are set independently. Compared to the conventional master-slave autofocus mechanism, the proposed content-aware focus mechanism allows the sensors to have different focal settings. Compared to the conventional free-run autofocus mechanism, the proposed content-aware focus mechanism drives the sensors to focus on the same object of interest. To put it simply, as the proposed content-aware focus mechanism allows the stereo camera to focus on the same object with different focal settings, the problems encountered by the conventional master-slave autofocus mechanism and free-run autofocus mechanism are avoided.

Figure 1:
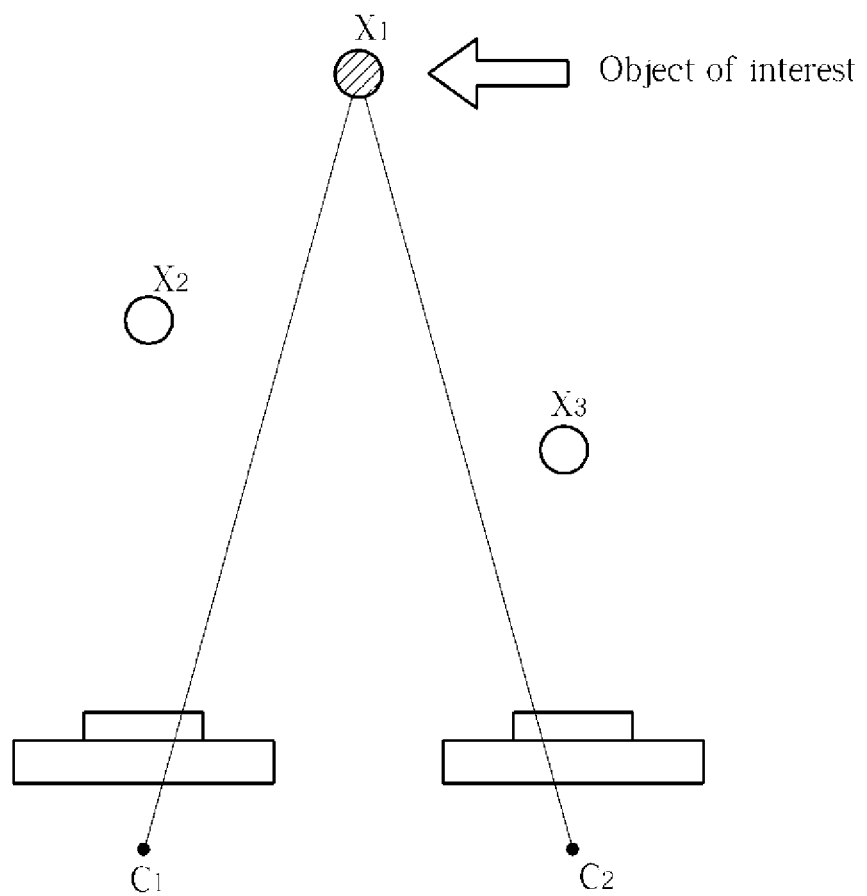
FIG. 1 is a diagram illustrating a first operation of a proposed content-aware focus mechanism according to the present application.
Figure 2:
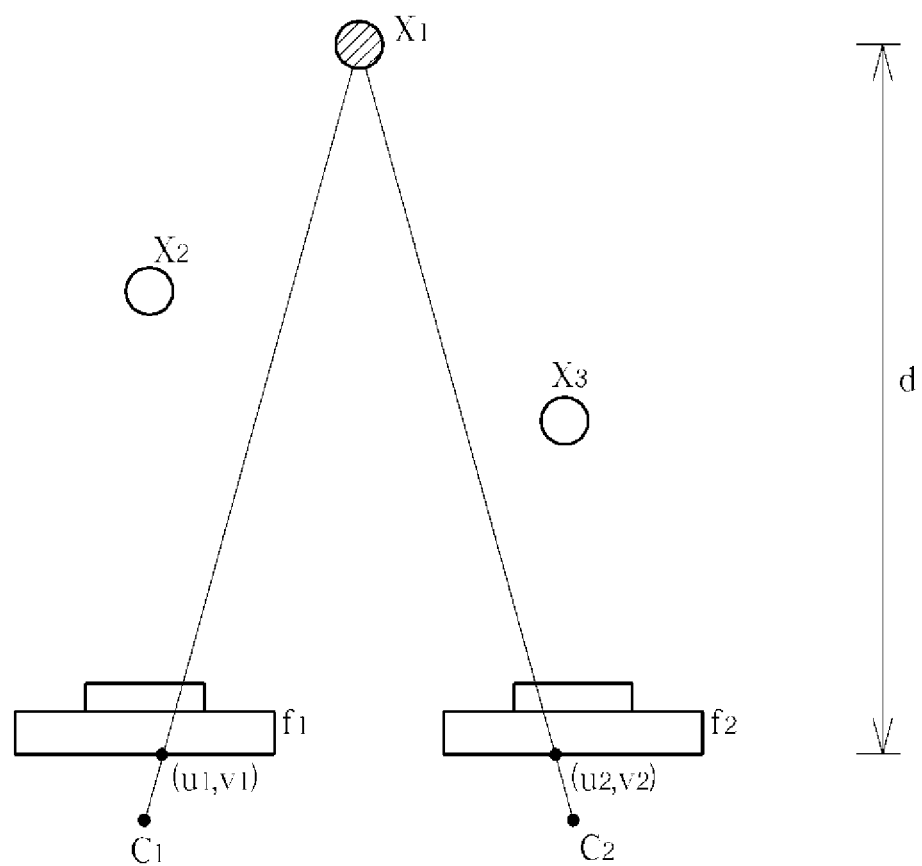
FIG. 2 is a diagram illustrating a second operation of the proposed content-aware focus mechanism.

Please refer to FIG. 1 and FIG. 2, which are diagrams illustrating the concept of the proposed content-aware focus mechanism. As shown in FIG. 1, there are many objects $X_1$, $X_2$, $X_3$ present in a scene to be captured by the stereo camera with two sensors $C_1$ and $C_2$, and the content-aware focus mechanism determines that the object of interest is $X_1$. Next, based on the object of interest $X_1$ with the depth d, the content-aware focus mechanism finds the corresponding region of interest $(u_1, v_1)$ in a preview image generated by the sensor $C_1$ and the corresponding region of interest $(u_2, v_2)$ in a preview image generated by the sensor $C_2$, and also determines the optimal focal settings $f_1$ and $f_2$ for respective sensors $C_1$ and $C_2$. Though the object of interest $X_1$ has the fixed depth d, the optimal focal settings $f_1$ and $f_2$ are determined independently and may be different from each other. Compared to the conventional master-slave mechanism, each of captured images generated by sensors $C_1$ and $C_2$ using respective optimal focal settings f1 and f2 has the same focused object of interest. Compared to the conventional free-run mechanism, the captured images generated by the sensors $C_1$ and $C_2$ using respective optimal focal settings f1 and f2 have the same focused object of interest located at the same depth d. Further details of the proposed content-aware focus mechanism are described as below.

Figure 3:
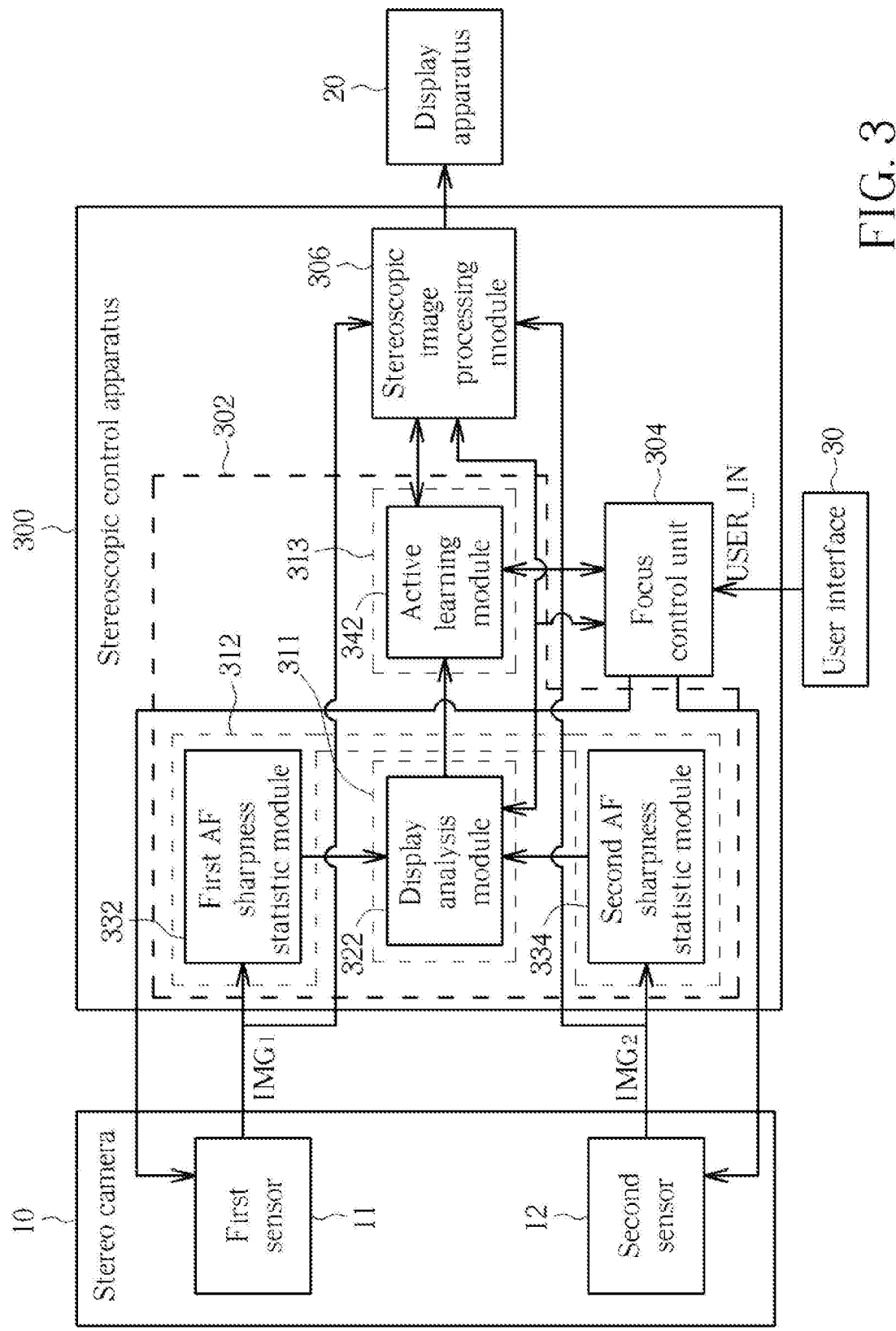
FIG. 3 is a diagram illustrating a stereoscopic control apparatus according to an embodiment of the present application.

Please refer to FIG. 3, which is a diagram illustrating a stereoscopic control apparatus according to an embodiment of the present application. By way of example, but not limitation, the stereoscopic control apparatus 300 may be disposed in an electronic device equipped with a stereo camera, such as a mobile phone with a stereo camera 10 having a first sensor (e.g., one of a left-view image sensor and a right-view image sensor) 11 and a second sensor (e.g., the other of the left-view image sensor and the right-view image sensor) 12. The stereoscopic control apparatus 300 includes a mapping unit 302, a focus control unit 304, and a stereoscopic image processing module 306. The mapping unit 302 is coupled to the stereo camera 10, and arranged for establishing at least one mapping relation. For example, a specific mapping relation between a specific disparity value and a specific set of a first focal setting value of the first sensor 11 and a second focal setting value of the second sensor 12 is determined by the mapping unit 302. Actually, the mapping unit 302 would record a plurality of mapping relations, each defining mapping between one disparity value and one set of a first focal setting value of the first sensor 11 and a second focal setting value of the second sensor 12. As each mapping relation is established by the same manner, the following only describes the generation and the use of one mapping relation (i.e., the specific mapping relation (D, $f_1$, $f_2$) mentioned hereinafter) for clarity and simplicity.

The focus control unit 304 is coupled to the mapping unit 302, and arranged for controlling stereoscopic focus of the stereo camera 10 according to the specific mapping relation obtained by the mapping unit 302. Specifically, when the criterion of using the specific mapping relation is met, the specific set of the first focal setting value $f_1$ and the second focal setting value $f_2$ as defined by the specific mapping relation (D, $f_1$, $f_2$) is used by the focus control unit 304 to control the stereo camera 10.

The stereoscopic image processing module 306 is coupled to a display apparatus 20. The display apparatus 20 may have two-dimensional (2D) display capability as well as three-dimensional (3D) display capability. Hence, the stereoscopic image processing module 306 is capable of controlling 2D display of one of a first image $IMG_1$ generated by the first sensor 11 and a second image $IMG_2$ generated by the second sensor 12. In addition, the stereoscopic image processing module 306 is also capable of controlling 3D/stereoscopic display of the image pair including the first image $IMG_1$ and the second image $IMG_2$, where one of the first image $IMG_1$ and the second image $IMG_2$ is a left-view image of a captured scene, and the other of the first image $IMG_1$ and the second image $IMG_2$ is a right-view image of the same captured scene. Based on the operational status of the stereo camera 10, the first image $IMG_1$ and the second image $IMG_2$ may be preview images generated before the user actually triggers the camera shutter or final captured images generated when the user actually triggers the camera shutter.

The mapping unit 302 has a plurality of processing blocks, including a first processing block 311, a second processing block 312 and a third processing block 313. In this embodiment, the first processing block 311 is arranged for determining an object of interest according to the first image $IMG_1$ and the second image $IMG_2$, and determining the specific disparity value D corresponding to the object of interest. By way of example, the first processing block 311 may be simply implemented using a disparity analysis module 322. Therefore, the disparity analysis module 322 is used to analyze the first image $IMG_1$ and the second image $IMG_2$ and accordingly generate a disparity analysis result (e.g., a disparity map/distribution), where the first image $IMG_1$ and the second image $IMG_2$ analyzed by the disparity analysis module 322 are preview images captured using non-optimal focus settings. For example, the disparity analysis module 322 may be configured to derive the disparity map/distribution by performing any existing method such as a stereo matching algorithm, a feature point extraction and matching algorithm or a region-based motion estimation algorithm. In addition, the disparity analysis module 322 further refers to the disparity map/distribution to determine an object of interest (e.g., the object $X_1$ shown in FIG. 1). Based on the human vision system, the object of interest would have a particular disparity characteristic among disparity characteristics of all objects present in the same scene. Hence, the disparity analysis module 322 can check the disparity map/distribution to identify an object with the particular disparity characteristic as the object of interest. After the object of interest is identified, the disparity analysis module 322 determines a corresponding region of interest (i.e., a region of visual attention) in each of the first image $IMG_1$ and the second image $IMG_2$. For example, when the object of interest is the object $X_1$ shown in FIG. 1, the disparity analysis module 322 determines one region of interest $(u_1, v_1)$ in the first image $IMG_1$, and further determines another region of interest $(u_2, v_2)$ in the second image $IMG_2$. It should be noted that the region of interest $(u_1, v_1)$ is not necessarily the center region of the first image $IMG_1$, and the region of interest $(u_2, v_2)$ is not necessarily the center region of the second image $IMG_2$. In addition to the region of interest $(u_1, v_1)$ and the region of interest $(u_2, v_2)$, the disparity analysis module 322 further determines a disparity value D of the object of interest. Specifically, the disparity value D is the horizontal displacement between the region of interest $(u_1, v_1)$ and the region of interest $(u_2, v_2)$.

Figure 4:
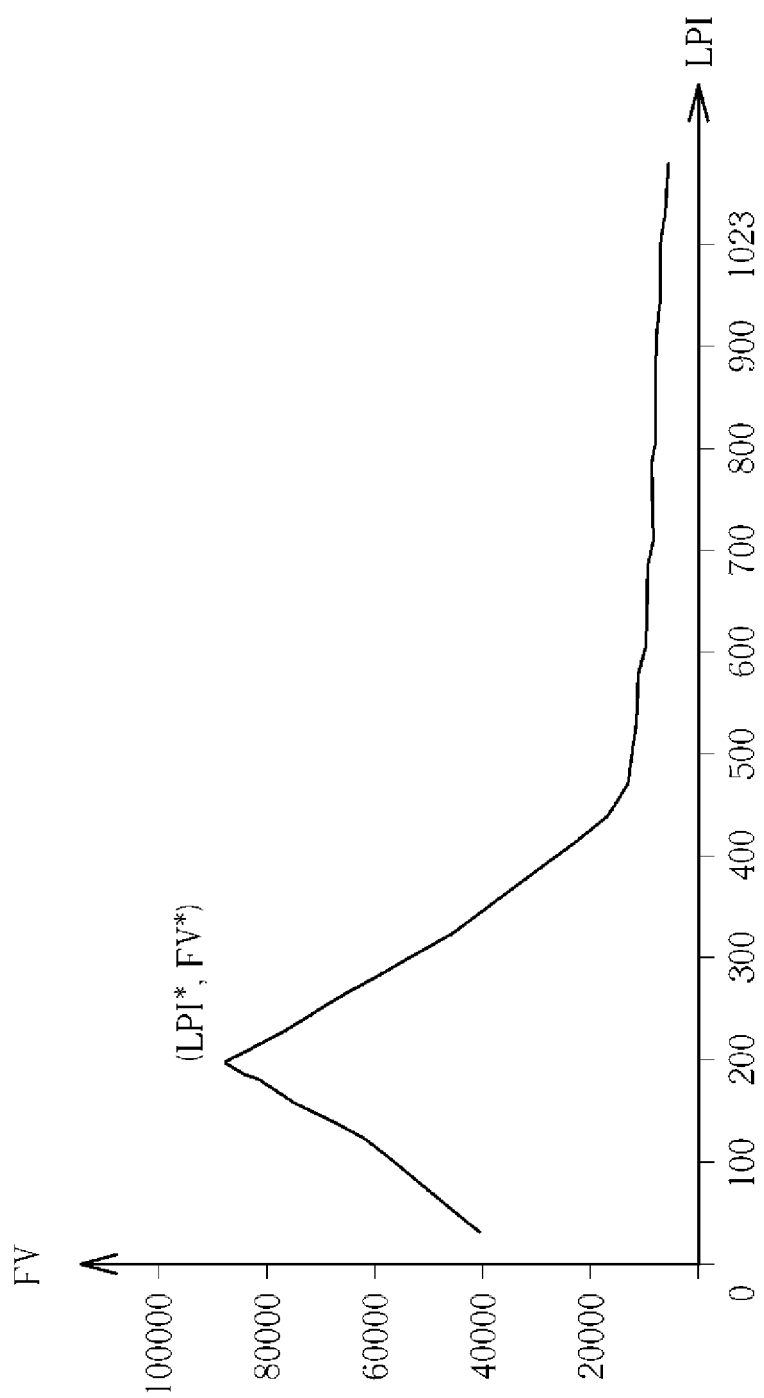
FIG. 4 is a diagram illustrating an example of an autofocus sharpness statistic result.

Regarding the second processing block 312 in the mapping unit 302, it is arranged for determining the specific set of the first focal setting value and the second focal setting value corresponding to the object of interest. By way of example, the second processing block 312 may be simply implemented using a first autofocus (AF) sharpness statistic module 332 and a second AF sharpness statistic module 334. Each of the first AF sharpness statistic module 332 and the second AF sharpness statistic module 334 may employ a conventional autofocus manner (e.g., the focus scan/search manner) to obtain one focus value FV corresponding to one lens position index LPI. For example, an AF sharpness statistic module (e.g., 332 or 334) drives a sensor (e.g., 11 or 12) to different positions corresponding to different lens position indexes, and therefore receives successive images generated from the sensor due to different positions. Next, the AF sharpness statistic module analyzes the image sharpness characteristic of each image to obtain a corresponding focus value FV. For example, if the image is more blurred due to non-optimal focal setting, there are fewer high-frequency components in the image. Thus, when the AF sharpness statistic module finds that the image at a position is blurred due to poor image sharpness, the focus value FV corresponding to the position would be set by a small value. An example of the AF sharpness statistic result is shown in FIG. 4. The AF sharpness statistic module identifies the peak value of the focus values as the optimal focus value FV*, and therefore determines the lens position index LPI* corresponding to the optimal focus value FV*. When the object of interest is the object $X_1$ shown in FIG. 1, the first AF sharpness statistic module 332 would determine a first lens position index LPI1* corresponding to an optimal focus value FV1*$(u_1, v_1)$ of the region of interest $(u_1, v_1)$ found in the first image $IMG_1$, and the second AF sharpness statistic module 334 would determine a second lens position index LPI2* corresponding to an optimal focus value FV2*$(u_2, v_2)$ of the region of interest $(u_2, v_2)$ found in the second image $IMG_2$.

In one exemplary design, the disparity analysis module 322 is operative to process preview images generated from the stereo camera 10 before the first AF sharpness statistic module 332 and the second AF sharpness statistic module 334 start processing the preview images. In an alternative design, the disparity analysis module 322 may be operative to process preview images generated from the stereo camera 10 after the first AF sharpness statistic module 332 and the second AF sharpness statistic module 334 start processing the preview images. Hence, the first AF sharpness statistic module 332 performs a focus scan/search (i.e., continuous optical blurring) on the whole preview image generated from the first sensor 11, and the second AF sharpness statistic module 334 performs a focus scan/search (i.e., continuous optical blurring) on the whole preview image generated from the second sensor 12. In this way, the disparity analysis module 322 can perform an efficient disparity analysis with reference to the AF sharpness statistics generated from the first AF sharpness statistic module 332 and the second AF sharpness statistic module 334. In other words, the AF sharpness statistics may provide information helpful for quickly and correctly determining the disparity map/distribution of the image pair of preview images, where the disparity value associates the first and second focal setting values with the first and second lens position indexes, respectively.

Regarding the third processing block 313, it is arranged for recording the specific mapping relation according to the specific disparity value and the specific set of the first focal setting value and the second focal setting value, where the specific disparity value is responsive to the disparity value D of the object of interest $X_1$, and the first focal setting value $f_1$ and the second focal setting value $f_2$ are responsive to the first lens position index LPI1* and the second lens position index LPI2*, respectively. By way of example, but not limitation, the specific disparity value may be set by the disparity value D, the first focal setting value $f_1$ may be set/modified according to the first lens position index LPI1*, and the second focal setting value $f_2$ may be set/modified according to the second lens position index LPI2*. In this embodiment, the third processing block 313 is simply implemented using an active learning module 342 arranged for performing an active/machine learning process. Hence, the active learning module 342 would automatically learn the specific mapping relation (D, $f_1$, $f_2$) by referring to the specific disparity value and the specific set of the first focal setting value and the second focal setting value.

In this embodiment, the active learning module 342 may be configured to employ any existing active/machine learning algorithm. When a plurality of image pairs, each including images obtained by the stereo camera 10 using optimal focal settings, are successively obtained, many mapping relations corresponding to different disparity values may be recorded/updated by the active learning module 342. For example, regarding the same specific disparity value (e.g., the disparity value D), a plurality of specific sets of the first focal setting value and the second focal setting value may be obtained by the second processing block 312. The specific mapping relation corresponding to the specific disparity value may be automatically learned by referring to the specific sets of the first focal setting value and the second focal setting value. Besides, additional information may also be recorded to facilitate the conventional stereoscopic focus control performed using the first AF sharpness statistic module 332 and the second AF sharpness statistic module 334. For example, the standard deviation of the first focal setting value and the standard deviation of the second focal setting value may also be calculated and recorded.

When a sufficient number of specific sets of the first focal setting value and the second focal setting value are obtained by the second processing block 312 after the user uses the stereo camera 10 for a period of time, the standard deviation of the first focal setting values and the standard deviation of the second focal setting value will become smaller, and the specific mapping relation corresponding to the specific disparity value will gradually converge to one particular first focal setting value and one particular second focal setting value. Before active learning of a requested mapping relation is converged, the focus control unit 304 may set the focus scan/search range of the first AF sharpness statistic module 332 by referring to the first focal setting value of the requested mapping relation and the standard deviation of the first focal setting value, set the focus scan/search range of the second AF sharpness statistic module 334 by referring to the second focal setting value of the requested mapping relation and the standard deviation of the second focal setting value, and use optimal focal settings found by the first AF sharpness statistic module 332 and the second AF sharpness statistic module 334 to perform stereoscopic focus control of the stereo camera 10. Thus, the first AF sharpness statistic module 332 can quickly find an optimal focal setting for the first sensor 11 without performing a full focus scan/search according to the preview image generated from the first sensor 11, and the second AF sharpness statistic module 334 can quickly find an optimal focal setting for the second sensor 12 without performing a full focus scan/search according to the preview image generated from the second sensor 12. In this way, the efficiency of the sharpness statistic based stereoscopic focus control can also be improved by the proposed active learning process.

After active learning of a requested mapping relation is converged, the focus control unit 304 directly queries the active learning module 342 for the desired focal settings without any focus scan/search operation. It should be noted that the recorded mapping relations, such as the specific mapping relation (D, $f_1$, $f_2$), could be used for a variety of stereoscopic control purposes. For example, the focus control unit 304 may control the stereoscopic autofocus of the stereo camera 10 according to the specific mapping relation (D, $f_1$, $f_2$). Hence, when the disparity analysis module 322 receives a current preview image pair including the first image $IMG_1$ generated by the first sensor 11 and the second image $IMG_2$ generated by the second sensor 12, the disparity analysis module 322 automatically determines a target disparity value of a target object of interest by performing disparity analysis upon the first image $IMG_1$ and the second image $IMG_2$. Specifically, based on a disparity map/distribution derived from the first image $IMG_1$ and the second image $IMG_2$, a target object of interest is determined by the disparity analysis module 322. Next, the disparity analysis module 322 identifies the target disparity value of the target object of interest correspondingly. Therefore, the focus control unit 304 uses the target disparity value provided by the disparity analysis module 322 to query the active learning module 342 for a corresponding set of a first focal setting value and a second focal setting value. In a case where the target disparity value is equal to the specific disparity value D, the active learning module 342 responds with the first focal setting value $f_1$ and the second focal setting value $f_2$ due to the recorded mapping relation (D, $f_1$, $f_2$), and the focus control unit 304 refers to the first focal setting value $f_1$ and the second focal setting value $f_2$ to perform the stereoscopic autofocus upon the stereo camera 10. In other words, the first sensor 11 is controlled by the focus control unit 304 to move to a position with the lens position index LPI1* indicated by the first focal setting value $f_1$, and the second sensor 12 is controlled by the focus control unit 304 to move to a position with the lens position index LPI2* indicated by the second focal setting value $f_2$. An image pair of a first image captured using an optimal focal setting (i.e., the queried first focal setting value $f_1$) and a second image captured using an optical focal setting (i.e., the queried second focal setting value $f_2$) are generated. In this way, an intelligent content-aware autofocus is realized by the focus control unit 304 collaborating with the mapping unit 302.

As mentioned above, the mapping relation between a disparity value and a set of a first focal setting value and a second focal setting value (e.g., a set of a first lens position index and a second lens position index) is automatically obtained by an active/machine learning process. Hence, the conventional AF calibration in a camera module house of the stereo camera 10 can be replaced by the proposed active learning module 342. In other words, the stereoscopic control apparatus 300 is capable of performing calibration-free autofocus control. As the conventional AF calibration is omitted in the camera module house, the production cost of the stereo camera 10 can be reduced correspondingly.

The focus control unit 304 may support other focus-related functions such as a stereoscopic touch focus function and a stereoscopic multi-point focus function. When the user enables the stereoscopic touch focus function, a user interface 30 is used to interact with the user and receives a user input USER_IN. For example, the user interface 30 may be a touch panel located on the display apparatus 20 for user interaction purpose. Hence, one of the first image $IMG_1$ and the second image $IMG_2$ included in a preview image pair currently captured by the stereo camera 10 may be displayed on the display apparatus 20. Supposing that the first image $IMG_1$ is displayed, the user can select a target focus region in the first image $IMG_1$ through touching the user interface 30. Consequently, the user input USER_IN is generated from the user interface 30 to the focus control unit 304, where the user input USER_IN indicates the target focus region selected by the user. Next, the focus control unit 304 requests the disparity analysis module 322 for a target disparity value corresponding to the target focus region. For example, the disparity analysis module 322 may employ a stereo matching algorithm to find a region of interest in the second image $IMG_2$ that matches the target focus region in the first image $IMG_1$, and then determine the target disparity value by checking the disparity between the user-selected target focus region in the first image $IMG_1$ and the identified region of interest in the second image $IMG_2$.

After receiving the target disparity value from the disparity analysis module 322, the focus control unit 304 uses the target disparity value to query the active learning module 342 for a corresponding set of a first focal setting value and a second focal setting value, and then controls the stereoscopic focus of the stereo camera 10 according to the first focal setting value and second focal setting value provided by the active learning module 342. In this way, a content-aware touch focus control is realized by the focus control unit 304 collaborating with the mapping unit 302.

When the user enables the stereoscopic multi-point focus function, the disparity analysis module 322 is operative to automatically determine a target disparity value of a target object of interest according to a disparity analysis result and a saliency analysis result both derived from the first image IMG1 and the second image IMG2 of the preview image pair currently captured by the stereo camera 10. For example, among multiple points in the captured scene, the target object of interest may be a point with the nearest focus depth. After receiving the target disparity value from the disparity analysis module 322, the focus control unit 304 uses the target disparity value to query the active learning module 342 for a corresponding set of a first focal setting value and a second focal setting value, and then controls the stereoscopic focus of the stereo camera 10 according to the first focal setting value and second focal setting value provided by the active learning module 342. In this way, a content-aware multi-point focus control is realized by the focus control unit 304 collaborating with the mapping unit 302.

The conventional multi-point focus mechanism performs a multi-point focus scan/search for finding a nearest focus depth. Generally, the conventional multi-point focus mechanism divides one image into a plurality of image regions, and performs a focus scan/search for each image region to find a corresponding optimal focal setting. Next, the conventional multi-point focus mechanism selects a target focal setting with the nearest focus depth from optimal focal settings respectively found in these image regions. As a result, the focus scan/search for multiple regions is time-consuming. Besides, it takes double time period for a stereo camera which generates two images. However, the proposed multi-point focus mechanism directly queries the active learning module 342 for the optimal focus setting without performing any focus scan/search. Compared to the conventional multi-point focus mechanism, the proposed multi-point focus mechanism is more efficient.

Besides the stereoscopic focus control function (e.g., stereoscopic autofocus control, stereoscopic touch focus control and/or stereoscopic multi-point focus control), the stereoscopic control apparatus 300 may support an intelligent auto-convergence function to further improve user's viewing experience. For example, the stereoscopic control apparatus 300 may perform coherent autofocus and auto-convergence for the same target object of interest in the same scene. In this embodiment, when the first image $IMG_1$ captured using the first focal setting value $f_1$ set by autofocus and the second image $IMG_2$ captured using the second focal setting value $f_2$ set by autofocus are generated from the stereo camera 10, the stereoscopic image processing module 306 is operative to simultaneously perform auto-convergence for a stereoscopic display of the first image $IMG_1$ and the second image $IMG_2$ according to an auto-convergence setting corresponding to the target object of interest. For example, the stereoscopic image processing module 306 refers to the auto-convergence setting to horizontally shift pixels of the first image $IMG_1$ and the second image $IMG_2$, thereby adjusting the disparity between the first image $IMG_1$ and the second image $IMG_2$ to make the saliency region (i.e., the target object of interest) viewed by the user with a comfortable disparity setting (e.g., zero disparity).

As mentioned above, the active learning module 342 may record a plurality of mapping relations. Each mapping relation defines the mapping between one disparity value and one set of a first focal setting value of the first sensor 11 and a second focal setting value of the second sensor 12, where the first focal setting value and the second focal setting value may be lens position indexes determined by the AF sharpness statistics generated from the first AF sharpness statistic module 332 and the second AF sharpness statistic module 334. Hence, if the AF sharpness statistic of the first image $IMG_1$ captured using the first focal setting value $f_1$ set by autofocus is obtained using the first AF sharpness statistic module 332 and the AF sharpness statistic of the second image $IMG_2$ captured using the second focal setting value $f_2$ set by autofocus is obtained using the second AF sharpness statistic module 334, a disparity value corresponding to the identified AF sharpness statistics may be obtained from a mapping relation recorded in the active learning module 342. When it is difficult to analyze disparity of an image which is complicated or has repeated patterns included therein, the sharpness value may be used for determining not only the focal setting but also the auto-convergence setting. In other words, the stereoscopic image processing unit 306 may refer to AF sharpness statistics of the first image $IMG_1$ and the second image $IMG_2$ to determine disparity information needed by the auto-convergence.

Those skilled in the art will readily observe that numerous modifications and alterations of the device and method may be made while retaining the teachings of the application. Accordingly, the above disclosure should be construed as limited only by the metes and bounds of the appended claims.

What is claimed is:

1. A control apparatus for controlling a camera, the control apparatus comprising:
processing circuitry configured to:
receive sets of images generated by the camera with corresponding focal setting values, each set of images including a first image and a second image, and each focal setting value including a value for controlling focus of the camera when the corresponding image is taken;
establish a mapping relation that associates a disparity value with at least one focal setting value that are paired based on analyzing disparity values of the sets of images and the corresponding focal setting values; and
control the focus of the camera according to the established mapping relation.

2. The control apparatus of claim 1, wherein the processing circuitry is configured to:
determine an object of interest according to the first image and the second image of a particular set of images and determining a disparity value of the particular set of images corresponding to the object of interest in the first image and the second image; and
establish the mapping relation based on the disparity value of the particular set of images and a corresponding focal setting value for controlling focus of the camera when the particular set of images is taken.

3. The control apparatus of claim 2, wherein the processing circuitry is configured to:
perform a focus scan operation for determining a lens position index corresponding to an optimal focus value of the camera at a region of interest in the image, where the region of interest corresponds to the object of interest;
determine the corresponding focal setting value based on the lens position index; and
determine the disparity value of the object of interest in the first image and the second image.

4. The control apparatus of claim 1, wherein the processing circuitry is configured to:
perform an active learning process to learn the mapping relation by referring to the disparity values and the focal setting values of the sets of images.

5. The control apparatus of claim 1, wherein the processing circuitry is configured to:
receive another set of images generated by the camera, the another set of images including a third image and a fourth image;
determine a target disparity value of a target object of interest according to the third image and the fourth image; and
determine a target focal setting value for controlling focus of the camera based on the target disparity value and the mapping relation.

6. The control apparatus of claim 5, wherein the processing circuitry is configured to:
receive a user input that indicates a target focus region in the another set of images; and
determine the target disparity value corresponding to the target focus region.

7. The control apparatus of claim 5, wherein the processing circuitry is configured to:
perform auto-convergence for a stereoscopic display of the third image and the fourth image according to an auto-convergence setting corresponding to the target object of interest,
wherein the auto-convergence determines disparity information is performed by referring to autofocus sharpness statistics of the third image and the fourth image.

8. A method of controlling a camera, comprising:
receiving sets of images generated by the camera with corresponding focal setting values, each set of images including a first image and a second image, and each focal setting value including a value for controlling focus of the camera when the corresponding image is taken;
establishing a mapping relation that associates a disparity value with at least one focal setting value that are paired based on analyzing disparity values of the sets of images and the corresponding focal setting values; and
controlling the focus of the camera according to the established mapping relation.

9. The method of claim 8, wherein the establishing the mapping relation comprises:
performing an active learning process to learn the mapping relation by referring to the disparity values and the focal setting values of the sets of images.

10. The method of claim 8, wherein the controlling the focus of the camera comprises:
receiving another set of images generated by the camera, the another set of images including a third image and a fourth image;
determining a target disparity value of a target object of interest according to the third image and the fourth image; and
determining a target focal setting value for controlling focus of the camera based on the target disparity value and the mapping relation.

11. A control apparatus for controlling focus for a plurality of sensors, the control apparatus comprising:
processing circuitry configured to:
receive sets of images generated by the plurality of sensors with corresponding sets of focal setting values, each set of images including a first image taken by a first sensor and a second image taken by a second sensor, and each set of focal setting values including a first focal setting value for controlling the focus for the first sensor when a corresponding first image is taken and a second focal setting value for controlling the focus for the second sensor when a corresponding second image is taken;
establish a mapping relation that associates a disparity value with a set of focal setting values that are paired based on analyzing disparity values of the sets of images and the corresponding sets of focal setting values; and
control the focus for the plurality of sensors according to the established mapping relation.

12. The control apparatus of claim 11, wherein the processing circuitry is configured to:
determine an object of interest according to the first image and the second image and determining the disparity value corresponding to the object of interest in the first image and the second image; and
establish the mapping relation based on the disparity value corresponding to the object of interest in the first image and the second image and the set of focal setting values for controlling the focus for the plurality of sensors when the images are taken.

13. The control apparatus of claim 11, wherein the processing circuitry is configured to:
perform a first focus scan operation for determining a first lens position index corresponding to a first optimal focus value for the first sensor at a first region of interest in the first image, where the first region of interest corresponds to the object of interest;
determine the first focal setting value based on the first lens position index;
perform a second focus scan operation for determining a second lens position index corresponding to a second optimal focus value for the second sensor at a second region of interest in the second image, where the second region of interest corresponds to the object of interest;
determine the second focal setting value based on the second lens position index; and
determine the disparity value of the object of interest in the first image and the second image.

14. The control apparatus of claim 11, wherein the processing circuitry is configured to:
perform an active learning process to learn the mapping relation by referring to the disparity value and the set of focal setting values of the images.

15. The control apparatus of claim 11, wherein the processing circuitry is configured to:
receive a third image generated by the first sensor and a fourth image generated by the second sensor;
determine a target disparity value of a target object of interest according to the third image and the fourth image; and
determine a set of target focal setting values for controlling focus of the sensors based on the target disparity value and the mapping relation.

16. The control apparatus of claim 15, wherein the processing circuitry is configured to:
receive a user input that indicates a target focus region in the third image or the fourth image; and
determine the target disparity value corresponding to the target focus region.

17. The control apparatus of claim 15, wherein the processing circuitry is configured to:
perform auto-convergence for a stereoscopic display of the third image and the fourth image according to an auto-convergence setting corresponding to the target object of interest,
wherein the auto-convergence determines disparity information is performed by referring to autofocus sharpness statistics of the third image and the fourth image.

18. A method of controlling focus for a plurality of sensors, comprising:
receiving sets of images generated by the plurality of sensors with corresponding sets of focal setting values, each set of images including a first image taken by a first sensor and a second image taken by a second sensor, and each set of focal setting values including a first focal setting value for controlling the focus for the first sensor when a corresponding first image is taken and a second focal setting value for controlling the focus for the second sensor when a corresponding second image is taken;
establishing a mapping relation that associates a disparity value with a set of focal setting values that are paired based on analyzing disparity values of the sets of images and the corresponding sets of focal setting values; and
controlling the focus for the plurality of sensors according to the established mapping relation.

19. The method of claim 18, wherein the establishing the mapping relation comprises:
performing an active learning process to learn the mapping relation by referring to the disparity value and the set of focal setting values of the images.

20. The method of claim 18, wherein the controlling the focus of the sensors comprises:
receiving a third image generated by the first sensor and a fourth image generated by the second sensor;
determining a target disparity value of a target object of interest according to the third image and the fourth image; and
determining a set of target focal setting values for controlling focus of the sensors based on the target disparity value and the mapping relation.

* * * * *